(12) United States Patent
Bedingfield (10) Patent No.: US 11,201,456 B2
(45) Date of Patent: Dec. 14, 2021

(54) MULTIPLE CHAMBER INNERDUCT STRUCTURE

(71) Applicant: Milliken & Company, Spartanburg, SC (US)

(72) Inventor: Steven L. Bedingfield, LaGrange, GA (US)

(73) Assignee: Milliken & Company, Spartanburg, SC (US)

(*) Notice: Subject to any disclaimer, the term of this patent is extended or adjusted under 35 U.S.C. 154(b) by 0 days.

(21) Appl. No.: 16/674,480

(22) Filed: Nov. 5, 2019

(65) Prior Publication Data

US 2020/0203937 A1 Jun. 25, 2020

Related U.S. Application Data

(60) Provisional application No. 62/782,449, filed on Dec. 20, 2018.

(51) Int. Cl.
*H02G 3/04* (2006.01)
*D03D 1/00* (2006.01)
(Continued)

(52) U.S. Cl.
CPC .......... *H02G 3/0406* (2013.01); *H02G 3/0437* (2013.01); *H02G 3/0487* (2013.01)

(58) Field of Classification Search
CPC ...... H02G 3/0406; H02G 3/0437; H02G 3/04; H02G 3/0487; H02G 3/28; H02G 9/04; H02G 9/06; H02G 9/065; H02G 1/08; H02G 9/0462; H02G 9/28; G02B 6/4459; G02B 6/50; G02B 6/46; G02B 6/54; D03D 21/00; D03D 13/00; D03D 15/00; D03D 1/0043; D06H 5/005; H01B 13/2673
See application file for complete search history.

(56) References Cited

U.S. PATENT DOCUMENTS 3,911,200 A 10/1975 Simons
4,281,211 A 7/1981 Tatum
(Continued)

FOREIGN PATENT DOCUMENTS

CN 1277643 12/2000
CN 1375071 10/2002
(Continued)

OTHER PUBLICATIONS

Patent Cooperation Treaty PCT International Search Report, dated Feb. 24, 2020. International Application No. PCT/US2019/060112. International Filing Date: Nov. 6, 2019.

*Primary Examiner* — Timothy J Thompson
*Assistant Examiner* — Amol H Patel
(74) *Attorney, Agent, or Firm* — Cheryl Brickey (57) ABSTRACT

A flexible innerduct structure having a first edge, a second edge, a first margin region, a second margin region, and a middle region. The middle region is located between the first and second margin regions. The innerduct structure comprises at least two flexible longitudinal tubes, each longitudinal tube forming two chambers. Each chamber is designed for enveloping at least one cable, where at least one of the longitudinal tubes extends from the first margin region to the second margin region, and wherein the tubes are attached together at an attachment in the middle region.

20 Claims, 4 Drawing Sheets

(51) Int. Cl.
  *D06H 5/00* (2006.01)
  *G02B 6/44* (2006.01)
  *D03D 15/00* (2021.01)
  *D03D 13/00* (2006.01)
  *D03D 21/00* (2006.01)

(56) References Cited

U.S. PATENT DOCUMENTS

| | | | |
|---|---|---|---|
| 4,582,093 | A | 4/1986 | Hubbard |
| 4,602,763 | A | 7/1986 | Gaylin |
| 4,761,194 | A | 8/1988 | Pithouse |
| 4,862,922 | A | 9/1989 | Kite, III |
| 4,929,478 | A | 5/1990 | Conaghan |
| 5,016,859 | A | 5/1991 | Zimmer |
| 5,027,864 | A | 7/1991 | Conti |
| 5,442,136 | A | 8/1995 | Allen |
| 5,513,149 | A | 4/1996 | Salmi |
| 5,587,115 | A | 12/1996 | Allen |
| 5,789,711 | A | 8/1998 | Gaeris |
| 5,843,542 | A | 12/1998 | Brushafer |
| 5,969,295 | A | 10/1999 | Boucino |
| 6,178,278 | B1 | 1/2001 | Keller |
| 6,251,201 | B1 | 6/2001 | Allen |
| 6,262,371 | B1 | 7/2001 | Allen |
| 6,304,698 | B1 | 10/2001 | Morris |
| 6,398,190 | B1 | 6/2002 | Li |
| 6,421,485 | B2 | 7/2002 | Morris |
| 6,471,440 | B1 | 10/2002 | Scheiwiller |
| 6,571,833 | B1 | 6/2003 | McLarty, III et al. |
| 6,718,100 | B2 | 4/2004 | Morris |
| 6,876,797 | B2 | 4/2005 | Morris |
| 6,886,601 | B2 | 5/2005 | Allen |
| 6,963,031 | B2 | 11/2005 | Gladfelter |
| 7,078,615 | B2 | 7/2006 | Gladfelter |
| 7,085,455 | B2 | 8/2006 | Morris |
| 7,085,458 | B2 | 8/2006 | Drew |
| 7,174,074 | B2 | 2/2007 | Drew |
| 7,319,802 | B2 | 1/2008 | Morris |
| 7,621,505 | B2 | 11/2009 | Hamrick |
| 7,754,971 | B2 | 7/2010 | Bedingfield |
| 7,799,997 | B2 | 9/2010 | Bedingfield |
| 8,387,954 | B2 | 3/2013 | Allen |
| 8,809,682 | B2 | 8/2014 | Hepfinger |
| 2003/0015248 | A1 | 1/2003 | Itoh |
| 2003/0123824 | A1 | 7/2003 | Tatarka |
| 2003/0142933 | A1 | 7/2003 | Morris |
| 2003/0183291 | A1 | 10/2003 | Allen |
| 2003/0185527 | A1 | 10/2003 | Morris |
| 2004/0033035 | A1 | 2/2004 | Morris |
| 2004/0081411 | A1 | 4/2004 | Gladfelter |
| 2005/0047735 | A1 | 3/2005 | Morris |
| 2005/0185902 | A1 | 8/2005 | James |
| 2006/0016507 | A1 | 1/2006 | Baer |
| 2006/0117807 | A1 | 6/2006 | Reiter |
| 2008/0054236 | A1 | 3/2008 | Morris |
| 2008/0264669 | A1 | 10/2008 | Bedingfield |
| 2009/0218002 | A1 | 9/2009 | Kashihara |
| 2012/0073854 | A1 | 3/2012 | Allen |
| 2012/0132309 | A1 | 5/2012 | Morris |
| 2012/0187271 | A1* | 7/2012 | Komiya ............... H02G 3/0487 248/634 |
| 2017/0145603 | A1* | 5/2017 | Bedingfield ............. H02G 9/06 |

FOREIGN PATENT DOCUMENTS

| | | | |
|---|---|---|---|
| CN | | 1679120 | 10/2005 |
| CN | | 101548216 | 9/2009 |
| CN | | 102007239 | 4/2011 |
| CN | | 102560802 | 7/2012 |
| CN | | 102611045 | 7/2012 |
| CN | | 106995969 | 8/2017 |
| CN | | 206502927 | 9/2017 |
| CN | | 211151396 | 7/2020 |
| DE | | 10204019 | 8/2003 |
| DE | | 102012100359 | 1/2012 |
| EP | | 0 045 212 | 4/1984 |
| EP | | 0225152 A2 * | 6/1987 ......... B29C 66/1122 |
| EP | | 0 225 152 | 10/1992 |
| EP | | 1254980 | 11/2002 |
| EP | | 1385246 | 1/2004 |
| GB | | 2084505 | 5/1984 |
| JP | | 2005116534 | 4/2005 |
| KR | | 1020040073979 | 8/2004 |
| WO | | 2004020888 | 3/2004 |
| WO | | 2008027467 | 3/2008 |
| WO | | 2008070819 | 6/2008 |
| WO | WO 2010/015872 | | 2/2010 |
| WO | WO-2010015872 A1 * | | 2/2010 ........... H02G 3/0462 |

* cited by examiner

MULTIPLE CHAMBER INNERDUCT STRUCTURE

RELATED APPLICATIONS

This application claims priority to U.S. provisional patent application 62/782,449, which is herein incorporated by reference in its entirety.

TECHNICAL FIELD

This invention relates generally to innerduct structures useful to position cables in conduit.

BACKGROUND

The use of a flexible innerduct structures within conduits serve multiple functions, including segregating individual cables into compartments or channels within the innerduct, to maximize the number of cables that may be positioned in a conduit, and facilitating insertion of cables into the conduit by preventing cable-against-cable friction and providing a tape or rope inside each compartment of the innerduct, for pulling the cable into the conduit.

Flexible innerduct structures made of textiles can have various shapes such as a "shared wall configuration", a "tear-drop configuration", and a tube. It would be desirable for an innerduct structure to minimize the amount of area taken up by seams in order to maximize the amount of usable space within small ducts.

BRIEF SUMMARY

A flexible innerduct structure having a first edge, a second edge, a first margin region, a second margin region, and a middle region. The middle region is located between the first and second margin regions. The innerduct structure comprises at least two flexible longitudinal tubes, each longitudinal tube forming two chambers. Each chamber is designed for enveloping at least one cable, where at least one of the longitudinal tubes extends from the first margin region to the second margin region, and wherein the tubes are attached together at an attachment in the middle region.

DETAILED DESCRIPTION

Flexible innerduct structures have chambers and are used within conduits to help segregate individual cables into compartments or channels within the innerduct, to maximize the number of cables that may be positioned in a conduit, and to facilitate insertion of cables into the conduit by preventing cable-against-cable friction and providing a tape or rope inside each compartment of the innerduct.

The conduits that the innerduct structures are used in may be of any suitable size (inner or outer diameter), material, and length. Conduits may also be referred to as ducts, pipes, elongated cylindrical elements, and others.

To form more than one chamber in an innerduct structure, typically a seam is used to attach the layers together (this could be multiple pieces of textile, a textile folded onto itself, or a combination of both). This seam may be formed by any suitable means including sewing, gluing, or ultrasonics. The more chambers, typically the bulkier the seam and the less flexible it is. A larger or bulkier seam (or attachment) area is less of a concern with larger conduits and pipes but becomes more important in small conduits where the attachment takes up a greater portion of the available space within the conduit.

Figure 1:
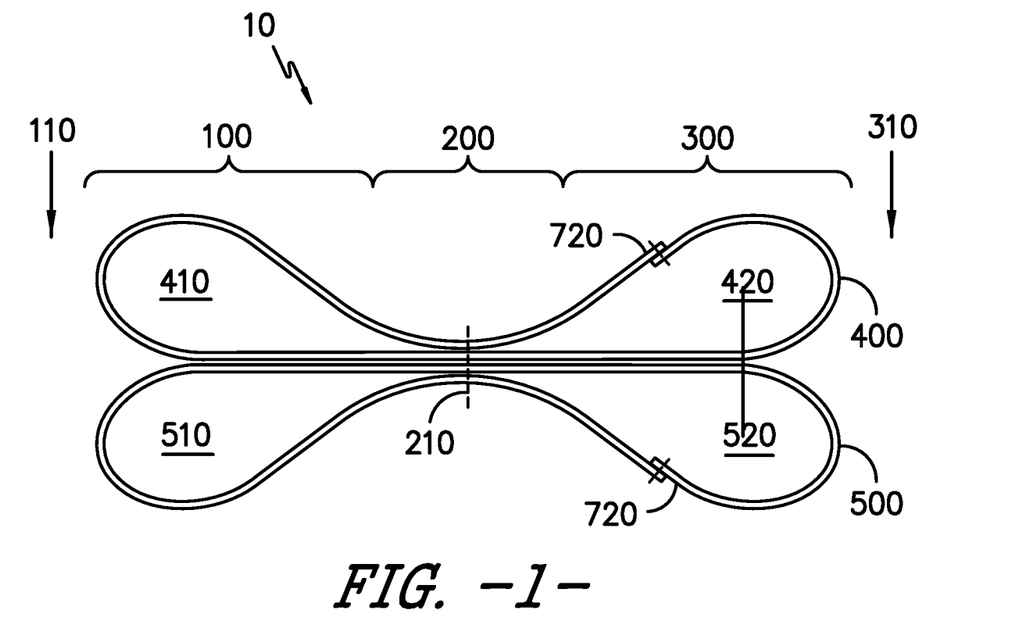
FIGS. 1-2 are cross-sectional illustrative views of embodiments of the flexible innerduct structure containing two flexible longitudinal tubes.

Referring to FIG. 1, there is shown one embodiment of the innerduct structure 10. The innerduct structure 10 contains three regions, a first margin region 100, a middle region 200, and a second margin region 300. In the structure 10 of FIG. 1, the structure 10 contains two flexible longitudinal tubes 400, 500, that each form 2 chambers (for cables, pull tapes, and the like) 410, 420 and 510, 520 respectively. At least one of the tubes 400, 500 (in this case both) extend from the first margin region 100 to the second margin region 300. The tubes 400, 500 are attached together using attachment 210 within the middle region 200.

Preferably, the width of the structure 10 (defined to be the distance between the first edge 110 and the second edge 310) is between about 20 and 40 mm, more preferably between about 21 and 39 mm. The width may also be larger or smaller than this range in order to fit a specific conduit. Preferably, the distance between the attachment 210 and the first edge 110 is between about 10 and 20 mm and the distance between the attachment 210 and the second edge 310 is between about 10 and 20 mm.

Preferably, the tubes 400, 500, 600 are only attached together at the attachment 210 and are no attached in the first margin region 100, second margin region 300, first edge 110, or second edge 210. This allows the chambers to spread and better fill the conduit. In the structure shown in FIGS. 1, 2, and 6, when installed into a conduit the chambers of the structure 10 spread to fill the conduit and have a dragon fly like appearance in cross-section.

The tubes 400, 500, 600 in the figures are each formed from a strip-shaped textile material that is then made into a tube having a seam along the longitudinal length of the tube shown as 720 in the illustrations. This seam may be stitched, ultrasonically welding, melted, or any other suitable attachment means.

Creating tubes from a strip-shaped textile material instead of as a seamless tube (using circular weaving or knitting for example) has many benefits. The first benefit is around splicing. It is much easier to splice flat strip-shaped textile materials together to create longer lengths then turn the strips into tubes than it is to splice together seamless tubes. Secondly, different sized tubes can be manufactured more easily with less machine downtime. Simply slitting the strip-shaped textile materials to different widths before turning them into tubes can create tubes with different diameters. For many seamless tube manufacturing processes, the setup of warps and/or weft would have to be redone in order to change the diameter of the tube being produced. In another embodiment, the innerduct 10 contains at least one chamber in the first margin and/or second margin that is a different size than the other chambers on that same margin region. For example, chambers 420 and 520 of FIG. 2 may be different sizes.

Figure 2:
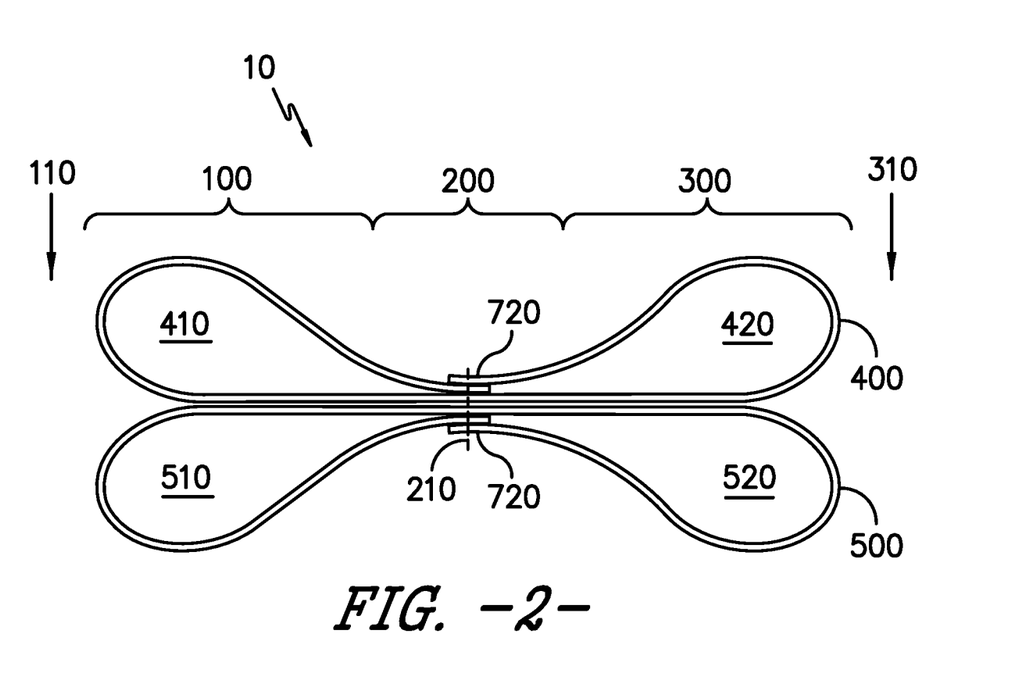

The seam 720 can be placed in any suitable location about the circumference of the tube, including any of the 3 regions 100, 200, 300 and even in the attachment 210 itself (such as shown in FIG. 2). The seam 720 may be formed by any suitable method including, but not limited to, stitching, ultrasonic welding, and gluing. The seams on each tube within the structure 10 may be in different locations. In one embodiment, the seams 720 are within the attachment 210 and the attachment 210 serves to attach the strips into tubes and the tubes together (in this embodiment, seams 720 and the attachment 210 may be the same).

In one embodiment, the attachment 210 is in the center of the middle region, defined to be approximately equidistant from the two edges of the structure. This is preferred to create chambers with all approximately the same size. In another embodiment, the attachment 210 is off-center, meaning that it is not in the center of the structure. This creates chambers in one of the margin regions to be larger than the chambers in the other margin region. This may be preferred to accommodate wires, cables, pull tapes, etc of varying sizes.

The attachment 210 may be formed from any suitable method. In one preferred embodiment, the attachment 210 is a sewn seam made by sewing the layers of textile together. Other methods of forming the attachment include stapling or riveting the textiles at intervals along the length, ultrasonic welding, or fastening the fabric with a hot melt or solvent based adhesive. The textiles may also be provided with relatively low temperature melting fibers, which can be melted and allowed to cool, thereby fusing the structure together at the attachment.

Figure 3:
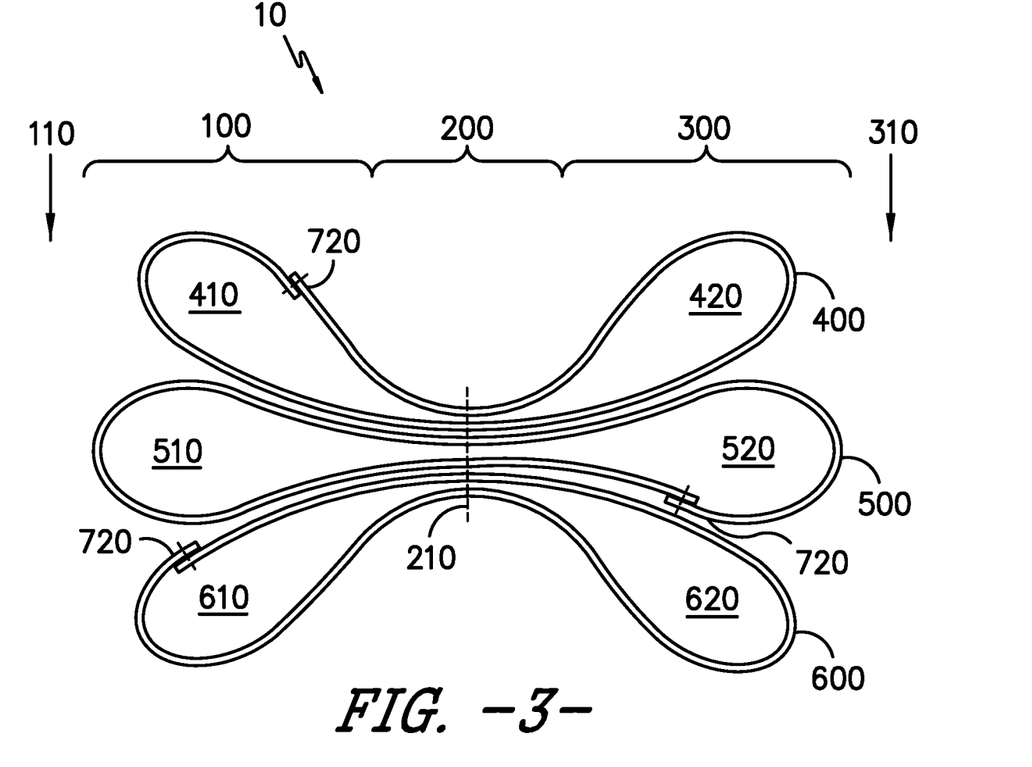
FIG. 3 is a cross-sectional illustrative view of one embodiment of the flexible innerduct structure containing three flexible longitudinal tubes.
Figure 4:
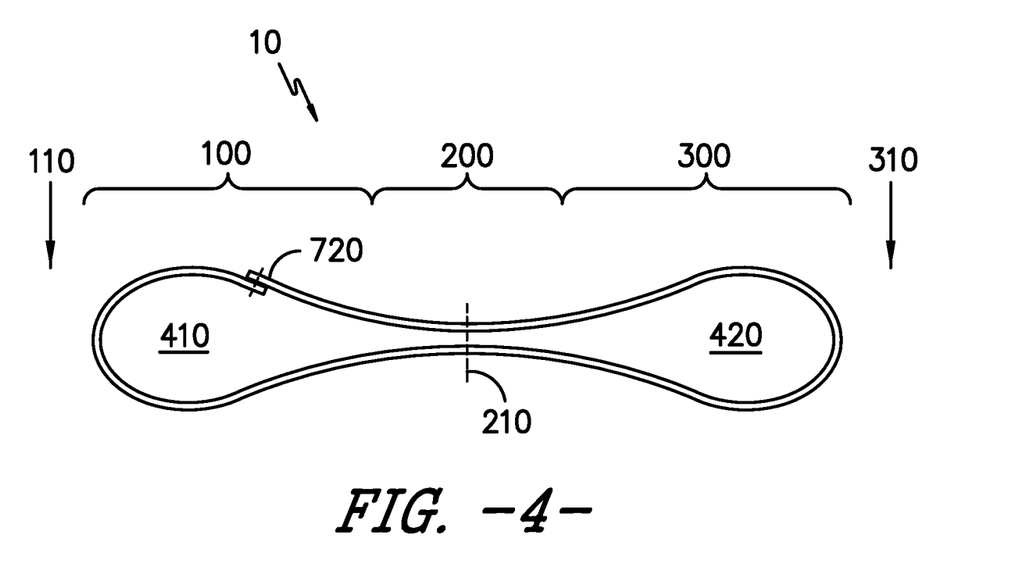
FIG. 4 is a cross-sectional illustrative view of one embodiment of the flexible innerduct structure containing one flexible longitudinal tube.
Figure 6:
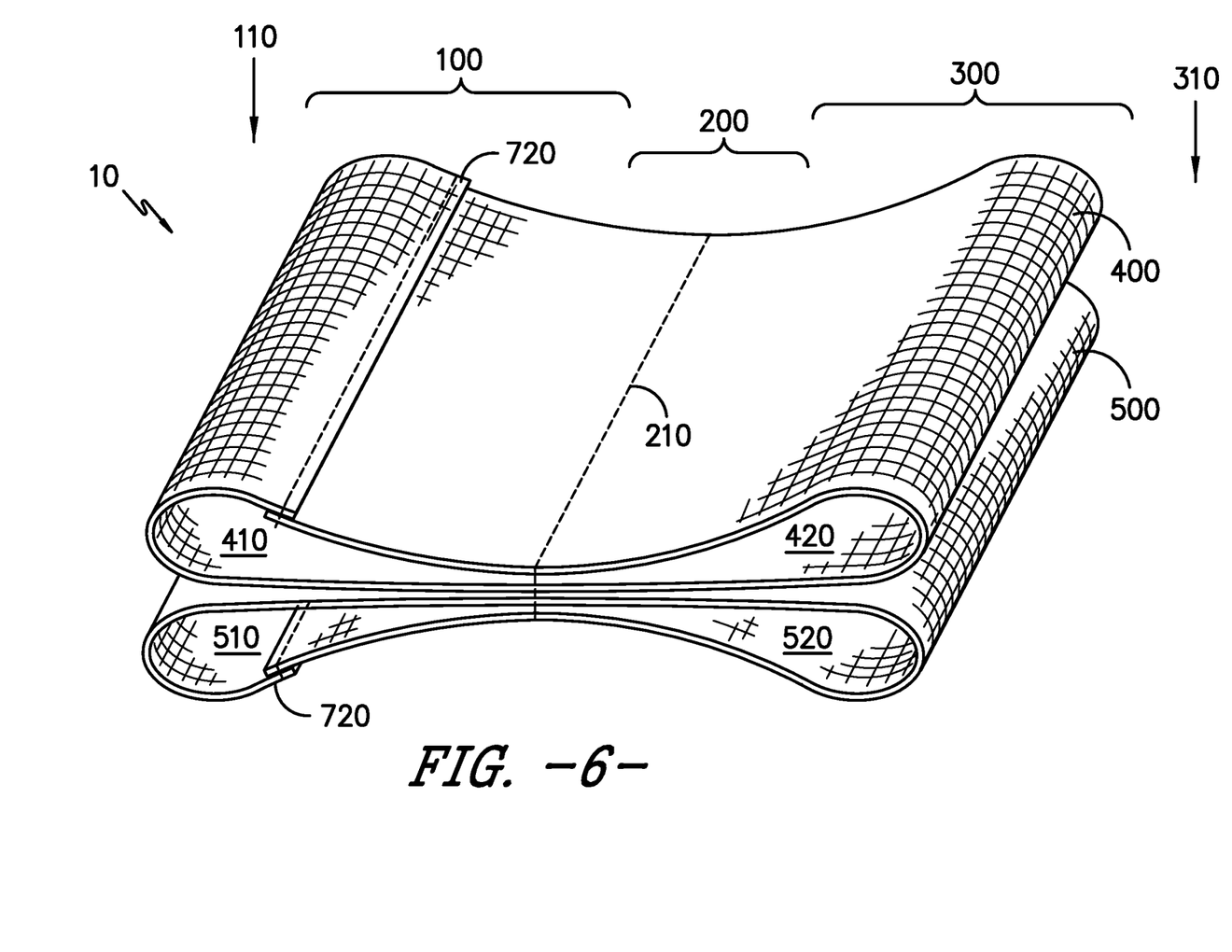
FIG. 6 is a prospective view of one embodiment of the flexible innerduct structure containing two flexible longitudinal tubes.

The structures 10 of FIGS. 1, 2, and 6 contain 2 tubes 400, 500 and a total of 4 chambers (2 chambers per tube). FIG. 3 shows an alternative embodiment of the structure having 3 tubes 400, 500, 600 and 6 chambers 410, 420, 510, 520, 610, 620. The innerduct structure may also have more than 3 tubes, the number of tubes being determined by the space within the conduit and desired end use. FIG. 4 shows another embodiment of the innerduct structure 10 having only one tube 400. The single tube provides two chambers 410, 420 on either side of the attachment 210.

In one embodiment, the number of textile layers at the attachment 210 is preferably twice the number of tubes and preferably the same as the number of chambers. In other folded configurations, to have an innerduct structure with the same number of chambers would typically have a greater number of textile layers in the attachment, which may make the attachment area take up more space and causes it to be less flexible. In other embodiments, one or more of the seams on the tube(s) may be located at the attachment. This may provide additional strength to the seams.

Figure 5:
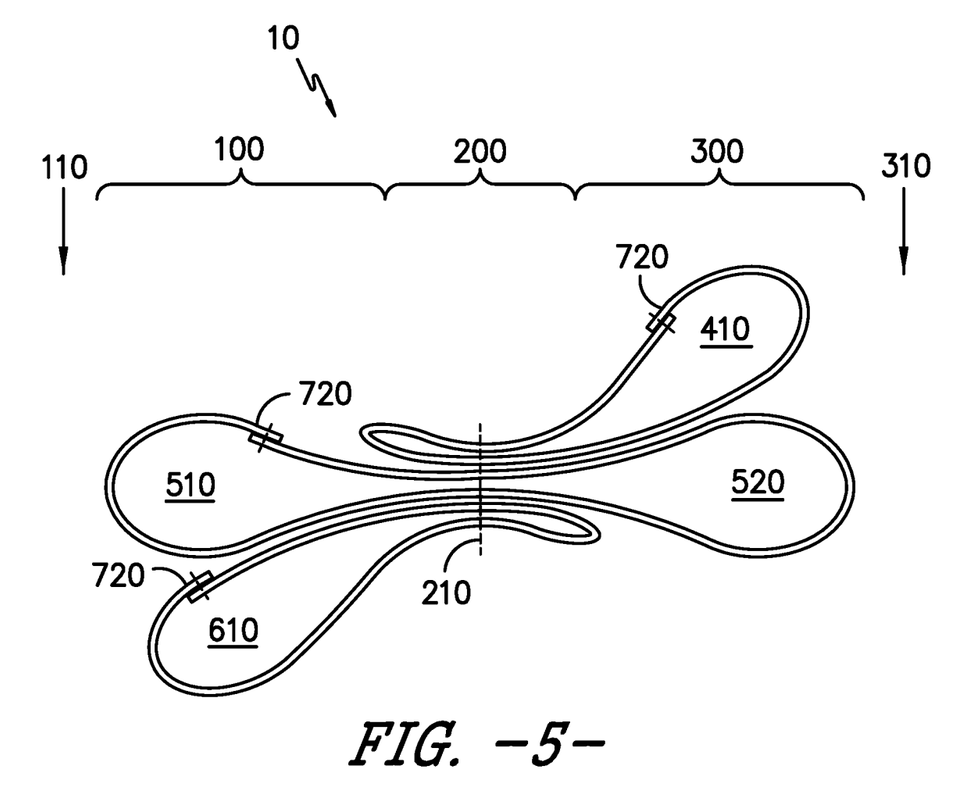
FIG. 5 is a cross-sectional illustrative view of one embodiment of the flexible innerduct structure containing three flexible longitudinal tube.

Preferably, at least one of the tubes 400, 500, 600 extend from the first margin region 100 to the second margin region 300, more preferably extending from the first edge 110 to the second edge 310. In FIGS. 1-4 and 6, all of the tubes meet this feature. The structure 10 of FIG. 5 contains 3 tubes, but only one of the tubes extends from the first margin region 100 to the second margin region 300 and from the first edge 110 to the second edge 310.

The flexible longitudinal tubes may be made from any suitable material including, but not limited to, woven, knit, and nonwoven textiles and films. Preferably, the flexible longitudinal tubes are made from woven textiles and the tubes within an innerduct structure can be made from the same or different textiles.

The terms "pick," "picks," "picks per inch" and "ppi" are intended to refer to (a) one filling yarn carried through a shed formed during the weaving process and interlaced with the warp yarns; and (b) two or more filling yarns carried through a shed during the weaving process, either separately or together, and interlaced with the warp yarns. Thus, for the purposes of determining the picks per inch of a woven textile fabric, multiple-inserted filling yarns are counted as a single pick.

The terms "multiple-insertion" and "double-insertion" are intended to include (a) multiple filling yarns inserted in the shed of the loom together; (b) multiple filling yarns inserted separately, while the shed of the loom remains the same; and (c) multiple filling yarns inserted separately, where the shed of the looms remains substantially the same, that is, the position of 25% or less of the warp yarns are changed between insertions of the yarns.

In one embodiment, the woven textile is preferably be a plain weave, although other constructions, such as twill or satin weaves, are within the scope of the invention. The individual warp yarns ("ends") are selected to provide high tenacity and low elongation at peak tensile load. By way of example, the warp yarns may be selected from polyesters, polyolefins, such as polypropylene, polyethylene and ethylene-propylene copolymers, and polyamides, such as nylon and aramid, e.g. Kevlar®. Yarns having a peak elongation at peak tensile load of 45% or less, preferably 30% or less, may be used. Monofilament yarns, including bi- and multi-component yarns, have been found to be particularly useful in innerduct applications. Multifilament yarns may also be used in the warp. Warp yarns having a denier of from 350 to 1,200, preferably 400 to 750, may be employed. The end count (yarns per inch in the warp) may range from 25 to 75 ends per inch, preferably from 35 to 65 ends per inch. In one embodiment of the invention a plain weave textile fabric having 35 to 65 ends per inch of 400 to 750 denier monofilament polyester warp yarns is provided. Preferably, the warp yarns comprise monofilament yarns, more preferably all of the warp yarns are monofilament yarns. Preferably, the warp yarns comprise polyester as polyester has been shown to create good cost and performance yarns.

By selecting warp yarns having a relatively low elongation at peak tensile load, it is possible to minimize lengthwise elongation of the innerduct structure during installation of the innerduct in a conduit, thereby avoiding "bunching" of the innerduct. Additionally, the elongation potential in the warp direction of the textile fabric incorporated into an innerduct can be minimized by reducing the warp crimp during the weaving process. For example, the warp crimp may be reduced by increasing the tension on the warp yarns during weaving to achieve a warp crimp of less than 5%, as measured by ASTM D3883—Standard Test Method for Yarn Crimp and Yarn Take-Up in Woven Fabrics. Reducing the warp crimp in the fabric, especially a plain weave fabric, results in an increase in the crimp of the filling yarn, which has the further advantage of increasing the seam strength along the longitudinal edges of the sections of fabric used to construct the innerduct.

Preferably, the fill yarns comprise monofilament yarns, preferably monofilament nylon yarns. In one embodiment, at least a portion of the filling yarns are multiple-inserted multifilament yarns in the woven textile fabric. In various embodiments of the invention, the woven textile fabric may be constructed with at least one-fourth of the picks being multiple-inserted multifilament yarns, at least one-third of the picks being multiple-inserted multifilament yarns, or even at least one-half of the picks being multiple-inserted multifilament yarns. Woven textile fabrics in which the multiple-inserted multifilament yarns are double-inserted have been found to be particularly useful for making innerduct structures.

In one embodiment, at least a portion of the filling yarns are multiple-inserted multifilament yarns. Each multifilament yarn is made of continuous filaments of a synthetic polymer. By way of example, the yarns may be selected from polyesters, polyolefins, such as polypropylene, polyethylene and ethylene-propylene copolymers, and polyamides, such as nylon and aramid. Each yarn may contain from 30 to 110 individual filaments, typically from 50 to 90 individual filaments, and the denier of the yarn may range from 200 to 1,000, typically from 500 to 800. Each multifilament yarn may be constructed of one, two or more plies. The multiple-inserted multifilament yarns may be inserted in the shed of the loom individually or together.

The multifilament yarns may be textured yarns, that is, yarns which have been treated to provide surface texture, bulk, stretch and/or warmth. Texturing may be accomplished by any suitable method, as is known to those skilled in the art. Of particular interest are textured polyester yarns. By way of example, the polyester may be polyethylene terephthalate. Other examples of suitable polyester polymers for use in fiber production may be found in U.S. Pat. No. 6,395,386 B2.

In one embodiment of the invention, the fill yarns are provided in an alternating arrangement of monofilament yarns and multifilament yarns, as disclosed in US Patent Application No. 20088/0264669 A1. The phrase "alternating arrangement" refers to a repeating pattern of picks of monofilament to multifilament yarns. By way of example, the arrangement of monofilament to multifilament yarns may be 1:1, 1:2, 1:3, 2:3, 3:4, or 3:5. It can be understood that some or all of the multifilament yarn picks may be multiple-inserted multifilament yarns.

Bi- or multi-component yarns of various configurations are intended to be included within the definition of monofilament yarns used in the alternating pattern in the filling direction of the fabric.

When monofilament yarns are included in the filling direction of the textile fabric, the monofilament filling yarns may be selected from polyesters, polyolefins, such as polypropylene, polyethylene and ethylene-propylene copolymers, and polyamides, such as nylon, particularly nylon 6, and aramid. Monofilament filling yarns having a denier of from 200 to 850, preferably 300 to 750, may be employed. In one embodiment of the invention, two different size monofilament yarns are incorporated into the alternating pattern in the filling direction. For example, one of the monofilament filling yarns may have a denier of less than 435 and the other monofilament filling yarn may have a denier greater than 435.

The pick count (picks per inch in the filling) may range from 12 to 28 picks per inch. One of the advantages of the present invention is that it is possible to provide a fabric at the lower end of the pick count range, in order to reduce filling rigidity and reduce material and manufacturing costs. Accordingly, woven textile fabrics having a pick count in the range of 12 to 22 picks per inch are preferred. In one embodiment of the invention a plain weave textile fabric having from 14 to 22 picks per inch of an alternating pattern of nylon monofilament and double-inserted textured polyester monofilament is provided.

In one embodiment, the woven textile may have a weave pattern that contains different repeating zones having different weave patterns such as plain, weaves with multiple insertions, and zones with floating yarns. In one embodiment, the textile making up the tubes contains alternating pattern containing first weave zones and partial float weave zones and contains a plurality warp yarns arranged into groupings of warp yarns, wherein each grouping contains between 2 and 10 warp yarns and a plurality of picks of weft yarns. In each first weave zone, the picks of weft yarns comprise a repeating first weft pattern of at least one monofilament yarn, at least one multiple-inserted multifilament yarn, and optionally at least one single-inserted multifilament yarn. In each partial float zone, the picks of weft yarns within the partial float weave zone comprise a repeating second weft pattern of at least one monofilament yarn, at least one multiple-inserted multifilament yarn, and optionally at least one single-inserted multifilament yarn. Only a portion of the warp yarns within at least a portion of the warp groupings float over 3 weft yarns including floating over at least one multiple-inserted multifilament weft yarn in at least a portion of weft pattern repeats, and wherein outside of the floats the non-floating warp yarns pass successively over and under alternating picks of weft yarns. Such a fabric is described in US Patent Application Publication 2017/0145603 which is herein incorporated by reference.

The woven textile may be made as a flat sheet in a conventional weaving machine or in a circular weaving machine. In some embodiments a circular weaving machine is preferred as it can make seamless tubes and eliminate the step of forming a sheet of woven textile into a tube. In other embodiments, a traditional weaving machine is preferred as it is typically a faster manufacturing process and multiple diameter tubes can be formed from one manufacturing line (the sheet just needs to be slit at different widths).

To draw the fiber optic, coaxial, or other cables through the innerduct structure, it is desirable to provide pull lines for such purpose. The pull lines are positioned within the compartments of the innerduct, preferably before installation of the innerduct within the conduit. By way of example, the pull lines may be tightly woven, relatively flat strips of material or may be a twisted ropes or multi-ply cords having a substantially round cross-section.

Preferably, the innerduct and the pull line have respective values of elongation percentage which are substantially equal for a given tensile load. If elongation of the innerduct differs substantially from that of a pull line, one of those structures may lag relative to the other when they are pulled together through a conduit during installation, resulting in bunching of the innerduct. The pull lines may be formed of tightly woven, polyester material, which exhibits a tensile strength of between about 400 pounds and about 3,000 pounds.

Generally, a conduit is a rigid or semi-rigid piping or duct system for protecting and routing cables, electrical wiring and the like. The term "cable" is intended to include fiber optic cables, electrical wires, coaxial and triaxial cables, as well as any other line for transmitting electricity and/or electromagnetic signals. By way of example, the conduit may be made of metal, synthetic polymer, such as thermoplastic polymer, clay or concrete. The passageway through the conduit may have a round, oval, rectangular or polygonal cross-section. The present invention finds utility in combination with virtually any conduit system. Depending upon the relative size of the passageway in the innerduct, typically calculated as the inside diameter, persons skilled in the art may select from the width of the innerduct, number of compartments in each innerduct, and number of individual innerducts, to maximize the capacity of the conduit.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An flexible innerduct structure having a first edge, a second edge, a first margin region, a second margin region, and a middle region, wherein the middle region is located between the first and second margin regions, wherein the innerduct structure comprises:
   at least two flexible longitudinal tubes, wherein each longitudinal tube comprises only one strip-shaped textile material having longitudinal edges and only one seam which joins the longitudinal edges of the strip-shaped textile material, wherein each longitudinal tube forms two chambers, wherein each chamber is designed for enveloping at least one cable, wherein at least one of the longitudinal tubes extends from the first margin region to the second margin region, and wherein the at least two flexible longitudinal tubes are attached together at an attachment in the middle region.

2. The flexible innerduct structure of claim 1, wherein the innerduct structure comprises two flexible longitudinal tubes and four chambers.

3. The flexible innerduct structure of claim 1, wherein the innerduct structure comprises three flexible longitudinal tubes and six chambers.

4. The flexible innerduct of claim 1, wherein the longitudinal tubes comprise a woven textile.

5. The flexible innerduct of claim 4, wherein the number of layers of textile attached together in the middle region is two times the number of longitudinal tubes.

6. The flexible innerduct structure of claim 4, wherein the textile material comprises warp yarns in the longitudinal direction of the flexible innerduct and fill yarns in the transverse direction of the flexible innerduct.

7. The flexible innerduct structure of claim 4, wherein the textile material is a woven fabric comprising an alternating pattern containing first weave zones and partial float weave zones and comprising:
   a plurality warp yarns arranged into groupings of warp yarns, wherein each grouping contains between 2 and 10 warp yarns; and,
   a plurality of picks of weft yarns;
   wherein in each first weave zone the picks of weft yarns comprise a repeating first weft pattern of at least one monofilament yarn, at least one multiple-inserted multifilament yarn, and optionally at least one single-inserted multifilament yarn,
   wherein in each partial float zone the picks of weft yarns within the partial float weave zone comprise a repeating second weft pattern of at least one monofilament yarn, at least one multiple-inserted multifilament yarn, and optionally at least one single-inserted multifilament yarn,
   wherein only a portion of the warp yarns within at least a portion of the warp groupings float over 3 weft yarns including floating over at least one multiple-inserted multifilament weft yarn in at least a portion of weft pattern repeats, and wherein outside of the floats the non-floating warp yarns pass successively over and under alternating picks of weft yarns.

8. The flexible innerduct of claim 1, wherein the distance between the attachment to the first edge is greater than the distance between the attachment and the second edge.

9. The flexible innerduct of claim 1, wherein the distance between the first edge and the second edge is between about 21 and 39 mm.

10. The flexible innerduct of claim 1, wherein the tubes are attached together at the attachment by sewing.

11. The flexible innerduct structure of claim 1, further including a cable in at least one of the innerduct chambers.

12. The flexible innerduct structure of claim 1, further including a pull line in at least one of the innerduct chambers.

13. A conduit comprising one or more of the flexible innerduct structure of claim 1.

14. An flexible innerduct structure having a first edge, a second edge, a first margin region, a second margin region, and a middle region, wherein the middle region is located between the first and second margin regions, wherein the innerduct structure comprises:
   one flexible longitudinal tube forming two chambers, wherein the longitudinal tube comprises only one strip-shaped textile material having longitudinal edges and only one seam which joins the longitudinal edges of the strip-shaped textile material, wherein each chamber is designed for enveloping at least one cable, wherein the longitudinal tube extends from the first margin region to the second margin region, and wherein the tube is attached together at an attachment in the middle region.

15. The flexible innerduct of claim 14, wherein the longitudinal tube comprises a woven textile.

16. The flexible innerduct of claim 15, wherein the number of layers of textile attached together in the middle region is two times the number of longitudinal tubes.

17. The flexible innerduct of claim 14, wherein the distance between the attachment to the first edge is greater than the distance between the attachment and the second edge.

18. The flexible innerduct of claim 14, wherein the distance between the first edge and the second edge is between about 21 and 39 mm.

19. The flexible innerduct of claim 14, wherein the tube is attached together at the attachment by sewing.

20. A conduit comprising one or more of the flexible innerduct structure of claim 14.

* * * * *